E. J. HARDY.
EMPLOYEE'S TRAIN TIME CARD.
APPLICATION FILED AUG. 25, 1911.

1,043,696.                                                              Patented Nov. 5, 1912.
2 SHEETS—SHEET 1.

Fig. 1.

INVENTOR
Edward J. Hardy
BY
ATTORNEYS

WITNESSES

E. J. HARDY.
EMPLOYEE'S TRAIN TIME CARD.
APPLICATION FILED AUG. 25, 1911.

1,043,696.

Patented Nov. 5, 1912.
2 SHEETS—SHEET 2.

Fig. 2.

| FORM 31 | S. P & S R.R.CO. A & C R R.R.CO. Train Order No. 156 | FORM 31 |

Sup't Office 4-2 1911

TO CONDUCTOR AND ENGINEMAN
TRAIN Eng 1240    AT Pasco Station.

X_____OPR._____M.

Eng 1240 run Extra Pasco to Cliffs with rights over all except first class trains on Symbol A time.

JPR Superintendent.

CONDUCTOR AND ENGINEMAN MUST EACH HAVE A COPY OF THIS ORDER.

Repeated at 2:20 AM

| Conductor | Train | Made | Time | Operator |
|---|---|---|---|---|
| Smith | Ex 1240 | Complete | 2:20 AM | Walker |

WITNESSES
E. H. Reichenbach.
Rev. G. Hooster.

INVENTOR
Edward J. Hardy
BY Munn Co.
ATTORNEYS

UNITED STATES PATENT OFFICE.

EDWARD JUDGE HARDY, OF LYLE, WASHINGTON, ASSIGNOR OF ONE-HALF TO FRANK R. WALKER, OF LYLE, WASHINGTON.

EMPLOYEE'S TRAIN TIME-CARD.

1,043,696.  Specification of Letters Patent.  Patented Nov. 5, 1912.

Application filed August 25, 1911. Serial No. 645,992.

*To all whom it may concern:*

Be it known that I, EDWARD J. HARDY, a citizen of the United States, and a resident of Lyle, in the county of Klickitat and State of Washington, have invented a new and Improved Employee's Train Time-Card, of which the following is a full, clear, and exact description.

The object of the invention is to provide a new and improved employee's train time card through the use of which the movements of the regular trains (passenger and freight), and extra or irregular trains are controlled without requiring a large amount of calculating work on the part of the train despatcher, and issuing, despatching and repeating many worded or lengthly train orders, at the same time insuring a high degree of safety in the running of all trains.

The method consists essentially in the laying out of graduated scales of maximum speed rates for all extra trains to be run during a day or other given period, providing such scales with a heading and transmitting train orders under the corresponding headings to the persons in charge of the extra trains.

The means employed for carrying the method into effect consists essentially in an employee's timetable or schedule and a train order, and of which the schedule is to be used by the employees, and contains besides the running time of the regular trains, a graduated scale of maximum speed rates to govern the running of extra or irregular trains, such graduated scales being headed by symbols to permit of designating the graduated scale in a train order by the symbol heading.

A practical embodiment of the invention is represented in the accompanying drawings forming a part of this specification, in which similar characters of reference indicate corresponding parts in all the views.

Figure 1 is a face view of the timetable or schedule provided with the graduated scales of maximum speed rates and their symbol headings; and Fig. 2 is a face view of a train order according to the improved method.

In controlling the movements of railway trains, it is the practice, under present methods, now and hitherto in general use on railroads in this country, to direct the movements of all irregular passenger and freight trains, technically called "extra" trains, solely by special instructions transmitted by telegraph or telephone on a prescribed form of train order, addressed to the persons in charge of such irregular trains, such trains not being included in the regular official timetable issued for the guidance of employees and containing rules and instructions governing the movements of all regular trains, the running time rights of movement as against other regular trains, according to class, direction of movement, etc., and designating the meeting and passing time with other regular trains at certain points when on time. Under the present standard system as now practised on all important railroads in this country, all irregular or socalled "extra" passenger trains and all "extra" fast freight trains are moved and governed solely by the special form of running order, termed a schedule train order, according to the form prescribed, and transmitted by wire by the train despatcher in charge, who with only a few minutes at his disposal for the purpose hastily computes the time of such fast trains over his division, makes up a schedule train order, specifying the time such train is due at all stations and sidings, and designates therein the points at which such trains shall meet or pass other trains of the same class, or arranges the meeting and passing points to avoid any delays, usually giving such train the "rights" of a first class train, having precedence over trains of a lower class. In such a case, trains of a lower class take sidings and keep clear of the time of such extra fast trains at points where they are due to meet or pass such extra trains. Under the present system, such an order is made substantially to read as follows: " Order No. 100. To conductor and engineer on Engine 1240, Portland. Engine 1240 will run extra Portland to Washington, as follows: with right over all except first class trains: Leave Portland at ten o'clock (10.00 A. M.) (with time specified here where extra train is due at all intermediate stations and sidings) arriving at Washington at ten o'clock (10.00 P. M.) ". Such order is issued over the initials of the superintendent or proper official, to be signed by the conductor and repeated to the despatcher and duly indorsed as correct and complete by him. This order is transmitted to all trains likely to be affected by the movement of such train, and duly repeated, signed and completed for all trains concerned and for each train separately before such extra train or opposing trains can proceed. Such an order so transmitted to all concerned as described is estimated by competent train despatchers to require an average of from thirty-five to forty minutes for computation of time, transmission, repetition, repetition and completion, under favorable circumstances and conditions, for each extra train so stated from a terminal on a schedule order. Such an order contains on an average from one hundred to one hundred and twenty-five words, and requires from four to six or more repetitions, thus requiring the rapid transmission of from three hundred to six hundred words, with perfect accuracy for each order. Three to six schedule orders on a division in twenty-four hours, where traffic is heavy and congested, or delays, caused by blockades, wrecks, engine failures or unfavorable weather conditions are not unusual, and from two to four hours of the despatcher's time is taken up by the schedule orders alone, which is a severe strain on that official and frequently results in delays to trains in waiting for orders.

With my improved method and means presently to be described in detail, the person in charge of an extra train receives a direction which when carried out by such a person insures the proper running of the usual and extra trains without interference of one with the other.

As shown in Fig. 1, the employees' timetable A is provided with a column B containing the names of the stations between two points, and adjacent the station column B are arranged columns C, C' indicating the distance in miles from certain stations in the present instance, from Spokane and from Portland, and next to the column C is arranged a column D indicating the car capacity of sidings at the different stations mentioned in the column D. Adjacent the column C' is a column E indicating information as to water, coal, wyes, turntables and scales. The timetable A is further provided with the usual column F indicating the time of the various regular trains between the end stations and the stations along the line, the said time columns F being headed by headings G indicating the name of the train, whether passenger, freight, second class or third class, east bound or west bound, or north bound or south bound, as the case may be. The timetable A is further provided with time columns H indicating the time for extra trains to be run over the line, the time being given for the end stations as well as for all intermediate stations along the line. The columns H are headed Symbol A, Symbol B, Symbol C, Symbol D, Symbol E, etc., and the columns with their headings are arranged in conjunction with the column F for the corresponding trains, that is, trains of the first class, second class or third class. Thus, as shown in Fig. 1, symbol A indicates a first class passenger train, west bound, to leave at 2.30 a. m. and arrive at 4.29 a. m. with stops at the various stations according to the time specified for such stations; symbol B indicates a second class train; symbol C indicates a first class train; symbol D indicates a second class train; symbol E indicates a third class train, as will be readily understood by reference to Fig. 1. Now when it is desired to run any one of the five extra trains given on the timetable A, it is only necessary for the train despatcher to send a symbol message to the persons in charge of the extra train: for instance, if it is desired to run an extra train, symbol A, the train despatcher sends a train order, shown in Fig. 2, the order reading "Eng. 1240 run extra Pasco to Cliffs with rights over all except first-class trains on symbol A time." The recipient of the order refers to the column headed by symbol A and runs his train according to the time indicated in said column.

Under the present method of handling traffic in the divisions of a railroad, the schedules for the trains are so formulated that all trains when arriving late, at one end of a division, may be able to make up the lost time while running in that particular division. The schedules so formulated are the minimum speed rates on the division, and that they are so formulated is due to the fact that every division superintendent desires the trains to run on time over his district as far as possible. The regular schedules G, (Fig. 1), are minimum speed rates so that, for instance, should a train, say train No. 3, drawn by engine 1240, arrive at Pasco, one terminal of the division, forty minutes late, being then able leave for Cliffs, the other divisional terminal, at 2.30 a. m. instead of 1.50 a. m., the despatcher would not run this train forty minutes late from Pasco to Cliffs, but would arrange a new schedule, directing the train to run forty minutes late from Pasco to Finley; thirty minutes late from Finley to Yellepit; twenty minutes late from Yellepit to Colbia, and so on until the train gradually regains its regular schedule. This despatching is done in order to keep inferior trains moving against late No. 3 train, and necessitates a great deal of time and work, with danger present in each copy and additional figure, whereas with my improved system, a despatcher could send the train along, with a great saving of time and work and decrease the danger by ordering the train to proceed from Pasco to Cliffs under "Symbol A" through the medium of the simple train order shown in Fig. 2, copies of which are of course also sent to inferior trains likely to be affected by such an order. Thus the train proceeds to Cliffs under a maximum speed rate and makes up the forty minutes before leaving the division.

From the foregoing it will be seen that by the arrangement described it is not necessary for the train despatcher to mention in the order the full schedule time for this particular train, as the person in charge has the schedule on knowing the symbol heading. The brief order can be transmitted and repeated in from five to eight minutes and an important saving of time is hence effected, especially as every moment of time is of the utmost value to trains and to the despatcher, who is thus able to devote more of his time to other trains and to other important duties in connection with the movement of trains on his division. Four to six schedule orders can thus be reduced to twenty-five words each, resulting in the saving of from two to three hours of the despatcher's time with more prompt movement of the trains and less liability of errors. Regular trains when delayed more than twenty minutes, could also be instructed to use the time of a designated symbol, which being a maximum rate of speed for such class train, would admit of its making up its lost time without waiting for specific, detailed instructions from the despatcher from time to time, and station to station, by means of numerous "runlate", "wait", or "meet" orders for the protection and guidance of opposing trains, as its running time would be definitely fixed in the schedule by the one order to all concerned that such regular train was running on the time of a stated symbol.

In case an extra or a regular train should be unable to make the symbol time designated, it could be directed to run on a slower symbol, or as many minutes or hours late on such symbol time as the case or conditions required. The right to use the symbol time could be given over any part of the division, or terminated at any time by the despatcher. Several sections of a regular or extra train could be run on the same symbol. The new method would be in a measure, self-regulating and would increase the value and importance of the timetable, always more safe and reliable than special orders, and would reduce the liability of errors due to lost or blurred, soiled or torn carbon copies of orders, sometimes badly written on thin tissue paper for delivery to several trains, from one original copy.

A railroad rule of long standing, in general use, makes it a cardinal offence for a trainman or engineman in charge of a train or engine, and responsible for its movements, to occupy the main line of a road, without a copy of the printed official timetable in his possession and conveniently at hand for ready reference. Therefore, the use of the symbol time as stated would be sufficient notice and protection for all concerned, by a simple reference to the timetable and the plainly printed symbol figures of the designated symbol.

No train will move under any symbol unless so directed by train order. Any regular train or its sections, or an extra train may move over the entire division or over any part of the division under any symbol, if so instructed by train order. Regular trains, moving under symbols, unless otherwise instructed by train order, retain their timetable rights. Extra trains moving under symbols, unless otherwise instructed, retain their rights. Extra trains moving under symbols have only such rights as are conferred by train orders. All symbols on previous timetables, and all trains regular and extra, moving on the old timetable, expire with the change of timetable, and all trains moving on the old timetable symbol must have proper instructions before moving on the new timetable symbols. With the change of timetable, regular trains that were moving under old symbols will regain their time schedules, or regular time, on the new table, only, extra trains running on previous timetable symbols retain their running orders and such rights as were conferred by train order, but drop their old symbol schedules. Symbol running time may be provided to cover the twenty-four hour period for all trains in the timetable.

The maximum speed, or symbol figures, may be printed in red, or ink of some other color than black, to distinguish such symbol figures from the black figures in the column denoting the schedule time of regular trains. These maximum figures should be printed preferably in the official employees' timetable, as shown in the accompanying diagram (Fig. 1), in parallel columns with figures for regular trains, or they may be printed on a separate page of the timetable, or in a supplementary symbol schedule, if for any reason the latter is considered desirable. These maximum speed rates may be determined by a board of experts selected by the superintendent or other division staff official, preferably selecting one man from the track department, one from the mechanical department, one from the train service and one from the despatcher's staff. They should jointly estimate and compute the best time possible for trains to make under average conditions, according to class.

Symbol letters A, B, C, etc., or figures may be used to designate the maximum speed rates in the table. Another name than "symbol" may be used to designate such speed rates. By this "symbol" system and timetable, trains once started from terminals on proper authority on symbol time, could proceed to their destination, or symbol limits without further orders, the same as regular trains do now when on time, or in case of interruption of wire service.

Having thus described my invention, I claim as new and desire to secure by Letters Patent:

An employee's train time card comprising, in addition to the usual timetable ratings of regular trains, graduated scales of maximum speed rates in suitably designated series adapted to be readily and specially applied to regular and extra trains by notice, and wherein the time between any two stations is less than that between the corresponding stations of the usual timetable ratings, whereby all trains will thus be given timetable rating and all special schedule despatching done away with.

In testimony whereof I have signed by name to this specification in the presence of two subscribing witnesses.

EDWARD JUDGE HARDY.

Witnesses:
J. D. BISHOP,
MARTIN J. HIGLEY.

Copies of this patent may be obtained for five cents each, by addressing the "Commissioner of Patents, Washington, D. C."